US012314852B2

United States Patent
Gao et al.

(10) Patent No.: US 12,314,852 B2
(45) Date of Patent: May 27, 2025

(54) METHOD FOR RECOMMENDING OBJECT, COMPUTING DEVICE AND COMPUTER-READABLE STORAGE MEDIUM

(71) Applicant: BAIDU ONLINE NETWORK TECHNOLOGY (BEIJING) CO., LTD., Beijing (CN)

(72) Inventors: Chang Gao, Beijing (CN); Dongqin Yi, Beijing (CN); Hao Wen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1014 days.

(21) Appl. No.: 17/352,224

(22) Filed: Jun. 18, 2021

(65) Prior Publication Data

US 2021/0312290 A1  Oct. 7, 2021

(30) Foreign Application Priority Data

Nov. 16, 2020  (CN) .......................... 202011280880.4

(51) Int. Cl.
G06N 3/08 (2023.01)
G06N 3/045 (2023.01)

(52) U.S. Cl.
CPC .............. *G06N 3/08* (2013.01); *G06N 3/045* (2023.01)

(58) Field of Classification Search
CPC ...... G06N 3/08; G06N 3/045; G06Q 30/0631; G06Q 50/10; G06F 16/9535; H04N 21/4668; H04N 21/4666
See application file for complete search history.

(56) References Cited

U.S. PATENT DOCUMENTS

| 7,472,097 | B1 | 12/2008 | Scarborough et al. |
| 2018/0276734 | A1 | 9/2018 | Wu et al. |

(Continued)

FOREIGN PATENT DOCUMENTS

| CN | 107885889 A | 4/2018 |
| CN | 109241440 A | 1/2019 |

(Continued)

OTHER PUBLICATIONS

He et al., "Neural Collaborative Filtering" International World Wide Web Conference Committee, 2017, Australia, 10 pages.

(Continued)

*Primary Examiner* — Abdullah Al Kawsar
*Assistant Examiner* — Gisel Gabriela Faccenda
(74) *Attorney, Agent, or Firm* — MASCHOFF BRENNAN; Liang Huang (57) ABSTRACT

A method is provided. The method includes: inputting, to a first neural network, a user feature and an object feature of an object to be recommended, and acquiring a first recommendation result output by the first neural network for the object to be recommended; determining a feature that needs to be reinforced; inputting, to a second neural network, the first recommendation result and the feature that needs to be reinforced, and acquiring a second recommendation result output by the second neural network for the object to be recommended; and determining, based on at least the second recommendation result, a final recommendation result for the object to be recommended.

17 Claims, 3 Drawing Sheets

(56) References Cited

U.S. PATENT DOCUMENTS

2019/0295302 A1    9/2019  Fu et al.
2020/0134696 A1*   4/2020  Lardeux ............. G06Q 30/0254
2021/0248651 A1*   8/2021  Chang .................... G06F 18/10

FOREIGN PATENT DOCUMENTS

| | | | |
|---|---|---|---|
| CN | 110378726 A | | 10/2019 |
| CN | 110428231 A | | 11/2019 |
| CN | 110532372 A | | 12/2019 |
| CN | 110807150 A | | 2/2020 |
| CN | 110838020 A | | 2/2020 |
| CN | 110941755 A | | 3/2020 |
| CN | 111090993 A | | 5/2020 |
| CN | 111414539 A | | 7/2020 |
| CN | 111523044 A | * | 8/2020 |
| CN | 111563770 A | | 8/2020 |
| CN | 111680213 A | | 9/2020 |
| JP | 08271275 A | | 10/1996 |
| JP | 2000298662 A | | 10/2000 |
| JP | 2005521144 A | | 7/2005 |
| JP | 2019-219813 A | | 12/2019 |
| KR | 20190009063 A | | 1/2019 |
| KR | 20190119219 A | | 10/2019 |
| KR | 102107055 B1 | | 5/2020 |
| WO | 2020005499 A1 | | 1/2020 |

OTHER PUBLICATIONS

Hu Kuangda et al., "A User Interest Model of Multiple Search Terms Based on Neural Network Model," Journal of JiuJiang Vocational and Technical College, JiuJiang, Jiangxi, 332007) 4 pages.

* cited by examiner

METHOD FOR RECOMMENDING OBJECT, COMPUTING DEVICE AND COMPUTER-READABLE STORAGE MEDIUM

CROSS REFERENCE TO RELATED APPLICATION

This application claims priority to Chinese patent application No. 202011280880.4, filed on Nov. 16, 2020, the contents of which are hereby incorporated by reference in their entirety for all purposes.

TECHNICAL FIELD

The present disclosure relates to the technical field of artificial intelligence, specifically, the technical field of content recommendation and deep learning, and particularly to a method for recommending an object, a computing device, and a computer-readable storage medium.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include the fields such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies. Artificial intelligence has increasingly wide applications in various fields such as the field of object recommendation.

The methods described in this section are not necessarily methods that have been previously conceived or employed. It should not be assumed that any of the methods described in this section are considered to be the prior art just because they are included in this section, unless otherwise indicated expressly. Similarly, the problem mentioned in this section should not be considered to be universally recognized in any prior art, unless otherwise indicated expressly.

SUMMARY

According to an aspect of the present disclosure, a computer-implemented method is provided, and the method includes: inputting, to a first neural network, a user feature and an object feature of an object to be recommended, and acquiring a first recommendation result output by the first neural network for the object to be recommended, wherein the user feature comprises at least one user sub-feature, and the object feature of the object to be recommended comprises at least one object sub-feature; determining a feature that needs to be reinforced, wherein the feature that needs to be reinforced comprises one or more of the at least one user sub-feature and the at least one object sub-feature; inputting, to a second neural network, the first recommendation result and the feature that needs to be reinforced, and acquiring a second recommendation result output by the second neural network for the object to be recommended; and determining, based on at least the second recommendation result, a final recommendation result for the object to be recommended.

According to another aspect of the present disclosure, a computing device is further provided, and the computing device includes: one or more processors; and a memory storing one or more programs configured to be executed by the one or more processors, the one or more programs comprising instructions for: inputting, to a first neural network, a user feature and an object feature of an object to be recommended, and acquiring a first recommendation result output by the first neural network for the object to be recommended, wherein the user feature comprises at least one user sub-feature, and the object feature of the object to be recommended comprises at least one object sub-feature; determining a feature that needs to be reinforced, wherein the feature that needs to be reinforced comprises one or more of the at least one user sub-feature and the at least one object sub-feature; inputting, to a second neural network, the first recommendation result and the feature that needs to be reinforced, and acquiring a second recommendation result output by the second neural network for the object to be recommended; and determining, based on at least the second recommendation result, a final recommendation result for the object to be recommended.

According to another aspect of the present disclosure, a non-transitory computer-readable storage medium is further provided, and the computer-readable storage medium stores one or more programs comprising instructions that, when executed by one or more processors of a computing device, cause the computing device to perform operations including: inputting, to a first neural network, a user feature and an object feature of an object to be recommended, and acquiring a first recommendation result output by the first neural network for the object to be recommended, wherein the user feature comprises at least one user sub-feature, and the object feature of the object to be recommended comprises at least one object sub-feature; determining a feature that needs to be reinforced, wherein the feature that needs to be reinforced comprises one or more of the at least one user sub-feature and the at least one object sub-feature; inputting, to a second neural network, the first recommendation result and the feature that needs to be reinforced, and acquiring a second recommendation result output by the second neural network for the object to be recommended; and determining, based on at least the second recommendation result, a final recommendation result for the object to be recommended.

BRIEF DESCRIPTION OF THE DRAWINGS

The drawings show some embodiments and form a part of the specification, and are used to explain implementations of the embodiments together with a written description of the specification. The embodiments shown are merely for illustrative purposes and do not limit the scope of the claims. Throughout the drawings, identical reference numerals denote similar but not necessarily identical elements.

DETAILED DESCRIPTION

In the present disclosure, unless otherwise stated, the terms "first", "second", etc., used to describe various elements are not intended to limit the positional, temporal or importance relationship of these elements, but rather only to distinguish one component from another. In some examples, a first element and a second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any and all possible combinations of listed items.

As an aspect of the application of artificial intelligence technologies, a computer can be enabled to simulate a thinking process of a human based on a trained neural network and recommend a targeted object such as a product, content, or a service to different users. For example, in an information exchange recommendation scenario, audio, video, text content, etc. that may be of interest to a user can be recommended to the user; in a commodity purchase recommendation scenario, a commodity that may be of interest to a user can be recommended to the user; and in a match-making recommendation scenario, a person that may be of interest to a user can be recommended to the user.

In the related art, in order to determine whether to recommend, to a user, an object to be recommended, a user feature of the user and an object feature of the object to be recommended can be input to a trained neural network, and whether to perform the recommendation is determined based on a recommendation result output by the neural network. The recommendation result is determined based on an independent processing process of the neural network.

Therefore, the trained neural network may be considered as a black box that can simulate a thinking process of a human to implement specific determination. Related information for determination is input at an input end of the neural network, so that the neural network can output, at an output end, a corresponding result for implementing the determination. However, a processing process from the input end to the output end in the neural network is usually very complex and difficult to explain.

Based on this, the present disclosure proposes a computer-implemented method for recommending an object to a user by using a neural network, a neural network and a training method thereof, a computing device, and a medium. The neural network comprises a first neural network and a second neural network, and recommends an object to a user, and a user feature and an object feature of an object to be recommended are processed by using the first neural network, to output a first recommendation result for the object to be recommended; and a feature that needs to be reinforced in an input is determined, the first recommendation result output by the first neural network and the feature that needs to be reinforced are input to the second neural network, and a final recommendation result for the object to be recommended is determined based on at least a second recommendation result output by the second neural network. In this way, a feature that needs to be reinforced can be effectively reinforced in a processing process of a neural network, and the recommendation accuracy of the neural network can be improved. In addition, the impact, on a recommendation result, of the feature that needs to be reinforced is improved, so that the interpretability of the recommendation result can also be implemented.

The computer-implemented method for recommending an object to a user by using a neural network in the present disclosure is further described below in conjunction with the accompanying drawings.

Figure 1:
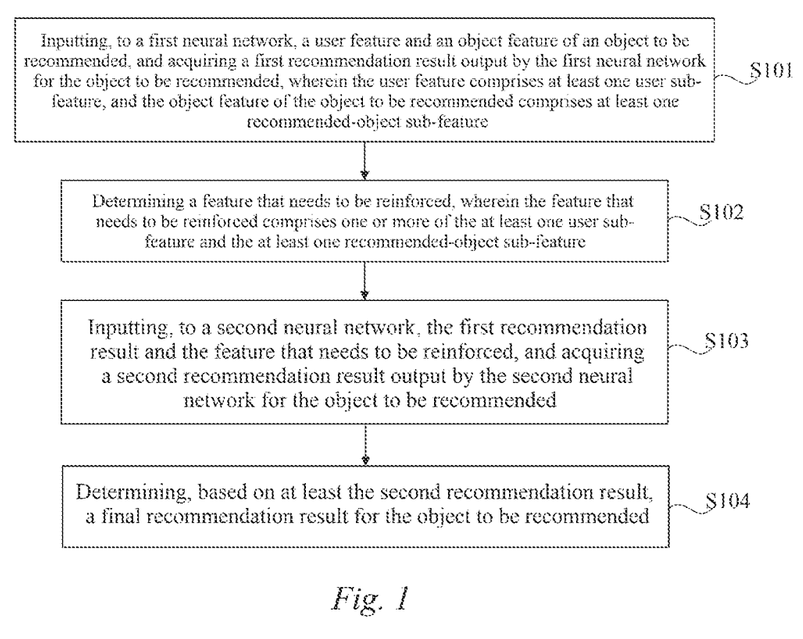
FIG. 1 is a flowchart showing a computer-implemented method for recommending an object to a user by using a neural network according to some embodiments.

FIG. 1 is a flowchart showing a computer-implemented method for recommending an object to a user by using a neural network according to some embodiments of the present disclosure, and the neural network comprises a first neural network and a second neural network. As shown in FIG. 1, the method comprises: step S101: inputting, to the first neural network, a user feature and an object feature of an object to be recommended, and acquiring a first recommendation result output by the first neural network for the object to be recommended, wherein the user feature comprises at least one user sub-feature, and the object feature of the object to be recommended comprises at least one object sub-feature; step S102: determining a feature that needs to be reinforced, wherein the feature that needs to be reinforced comprises one or more of the at least one user sub-feature and the at least one object sub-feature; step S103: inputting, to the second neural network, the first recommendation result and the feature that needs to be reinforced, and acquiring a second recommendation result output by the second neural network for the object to be recommended; and step S104: determining, based on at least the second recommendation result, a final recommendation result for the object to be recommended. In this way, in a process of recommending an object to a user by using a neural network, a feature that needs to be reinforced can be effectively reinforced, and the impact, on a recommendation result, of the feature that needs to be reinforced can be improved, thereby improving the accuracy and interpretability of the recommendation.

According to some embodiments, one or both of the first neural network and the second neural network may be a fully-connected neural network. Specifically, one of the first neural network and the second neural network may be set as a fully-connected neural network, or both the first neural network and the second neural network may be set as fully-connected neural networks. In this way, a structure of the neural network can be simplified, and the efficiency of performing object recommendation by using the neural network can be improved.

It may be understood that the first neural network and the second neural network in the present disclosure are not limited to the fully-connected neural network, and another network type such as a convolutional neural network may be used, which is not limited here.

According to some embodiments, the object to be recommended may comprise one or more of the following types of data: text, audio, and video. It may be understood that the type of the object to be recommended is based on a specific recommendation scenario, and is not limited to the types mentioned above, which is not limited here.

According to some embodiments, the first recommendation result, the second recommendation result, and the final recommendation result in the above method for recommending an object may comprise a numerical value such as a recommendation probability indicating a recommendation degree for the object to be recommended. In an example, when the recommendation probability for the object to be recommended is less than a threshold (for example, 0.7, 0.6, or 0.5), it can be determined not to recommend the object to be recommended, and when the recommendation probability for the object to be recommended is not less than the threshold, it can be determined to recommend the object to be recommended.

According to some embodiments, in step S101, a one-hot code of each user sub-feature in the user feature and a one-hot code of each object sub-feature of the object to be recommended may be determined. For example, for a gender-related user sub-feature, "female" may correspond to a one-hot code [1, 0, 0], "male" may correspond to a one-hot code [0, 1, 0], and the gender "unknown" may correspond to a one-hot code [0, 0, 1]. Further, dimensionality reduction can be performed on one-hot codes of all sub-features (including all user sub-features and all object sub-features) by using a first embedded layer, to obtain an embedded word vector of each sub-feature. For example, an embedded word vector corresponding to the gender "female" may be [0.2, 0.5], an embedded word vector corresponding to the gender "male" may be [0.7, 0.1], and an embedded word vector corresponding to the gender "unknown" may be [0.4, 0.6]. In some embodiments, embedded word vectors of all the sub-features can be spliced to obtain an input to the first neural network. In this way, subsequent processing of a neural network can be facilitated.

For step S102, according to some embodiments, the object feature of the object to be recommended may comprise a recommendation scenario identifier, and the feature that needs to be reinforced may be determined based on the recommendation scenario identifier. In this way, a corresponding feature that needs to be reinforced can be determined based on application requirements of different recommendation scenarios, so that features that need to be reinforced in different recommendation scenarios can be effectively reinforced.

According to some embodiments, the feature that needs to be reinforced may comprise only one or more user sub-features, or comprise only one or more object sub-features, or comprise both one or more user sub-features and one or more object sub-features.

According to some embodiments, the feature that needs to be reinforced may be determined based on prior experience. For example, in a local-news recommendation scenario, in order to enable a user to preferentially acquire local news, a user sub-feature related to a geographical location may be determined as a feature that needs to be reinforced; and in a sports events information recommendation scenario, in order to enable a user to preferentially acquire the latest sports events information, an object sub-feature of an object to be recommended that is related to a release time may be determined as a feature that needs to be reinforced.

For step S103, according to some embodiments, for "inputting, to the second neural network, the first recommendation result and the feature that needs to be reinforced", a one-hot code of the first recommendation result and a one-hot code of each sub-feature comprised in the feature that needs to be reinforced (comprising all the user sub-features and all the object sub-features comprised in the feature that needs to be reinforced) may be determined. Further, dimensionality reduction can be performed on the one-hot code of the first recommendation result by using a second embedded layer, to obtain an embedded word vector of the first recommendation result. For all the sub-features comprised in the feature that needs to be reinforced, the embedded word vector determined in step S101 may be directly used. In some embodiments, all embedded word vectors corresponding to the first recommendation result and the feature that needs to be reinforced can be spliced to obtain an input to the second neural network. The second embedded layer is different from the first embedded layer in step S101.

For step S104, according to some embodiments, the final recommendation result for the object to be recommended may be determined based on only the second recommendation result. In some embodiments, the second recommendation result may be determined as the final recommendation result.

According to some other embodiments, the final recommendation result for the object to be recommended may be determined based on the first recommendation result and the second recommendation result. In this way, the final recommendation result may be determined by combining the recommendation results output by the first neural network and the second neural network, and the accuracy of the final recommendation result can be improved.

In some embodiments, the final recommendation result may be a weighted sum of the first recommendation result and the second recommendation result. Particularly, the final recommendation result may be an average value of the first recommendation result and the second recommendation result.

For ease of understanding, a match-making recommendation scenario is now used as an example to describe the above-mentioned computer-implemented method for recommending an object to a user by using a neural network. It may be understood that the method for recommending an object proposed in the present disclosure is not limited to the match-making recommendation scenario, and may also be applied to other scenarios requiring object recommendation, which is not limited here.

In a specific embodiment, the computer-implemented method for recommending an object to a user by using a neural network may comprise:

inputting, to a first neural network, a user feature and an object feature of an object to be recommended. The user feature may comprise a plurality of user sub-features such as gender, age, educational background, and income level. The object to be recommended may be a person to be recommended to the user, and the object feature of the object to be recommended may also include a plurality of object sub-features such as gender, age, educational background, and income level. A first recommendation result for the object to be recommended that is output by the first neural network is acquired in response to inputting the user feature and the object feature to the first neural network. Specifically, the first recommendation result may be a numerical value such as 0.7.

In the match-making recommendation scenario, based on a match-making recommendation scenario identifier, user sub-features related to gender and age and object sub-features related to gender, age, and income level may be determined as features that need to be reinforced.

The first recommendation result and the features that need to be reinforced are input to a second neural network, and a second recommendation result such as 0.8 output by the second neural network is acquired.

A final recommendation result for the object to be recommended may be determined based on the second recommendation result, or the final recommendation result for the object to be recommended may be determined based on a weighted sum of the first recommendation result and the second recommendation result.

According to a preset threshold, when the final recommendation result is greater than the threshold, the object to be recommended is recommended to the user. For example, the preset threshold is 0.5, and the final recommendation result for the object to be recommended that is determined based on an average value of the first recommendation result 0.7 and the second recommendation result 0.8 is 0.75. Since the final recommendation result 0.75 is greater than the threshold 0.5, the object to be recommended is recommended to the user.

Figure 2:
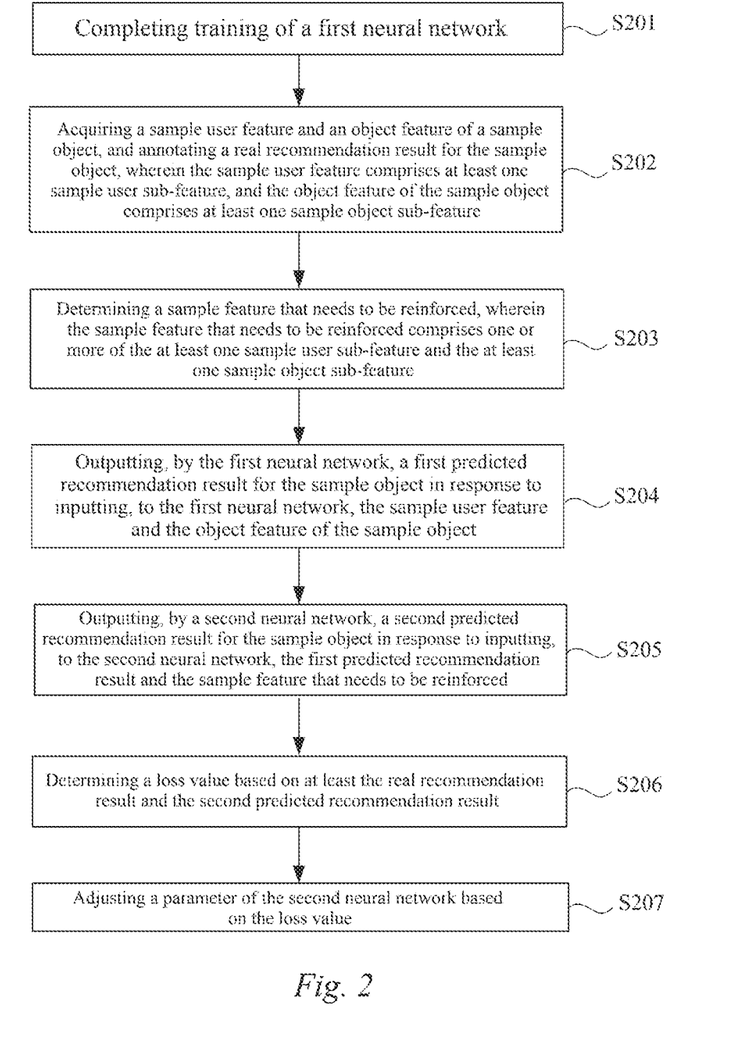
FIG. 2 is a flowchart showing a computer-implemented training method of a neural network according to some embodiments.

FIG. 2 is a flowchart showing a computer-implemented training method of a neural network according to some embodiments of the present disclosure, and the neural network comprises a first neural network and a second neural network. As shown in FIG. 2, the training method may comprise: step S201: completing training of the first neural network; step S202: acquiring a sample user feature and an object feature of a sample object, and annotating a real recommendation result for the sample object, wherein the sample user feature comprises at least one sample user sub-feature, and the object feature of the sample object comprises at least one sample object sub-feature; step S203: determining a sample feature that needs to be reinforced, wherein the sample feature that needs to be reinforced comprises one or more of the at least one sample user sub-feature and the at least one sample object sub-feature; step S204: outputting, by the first neural network, a first predicted recommendation result for the sample object in response to inputting the sample user feature and the object feature of the sample object to the first neural network; step S205: outputting, by the second neural network, a second predicted recommendation result for the sample object in response to inputting, to the second neural network, the first predicted recommendation result and the sample feature that needs to be reinforced; step S206: determining a loss value based on at least the real recommendation result and the second predicted recommendation result; and step S207: adjusting a parameter of the second neural network based on the loss value. In this way, in a training process of the neural network, the neural network can be enabled to perform reinforcement learning on features that need to be reinforced, thereby improving the accuracy of recommendation based on the neural network.

For step S201, training of the first neural network may be completed before training of the second neural network starts.

According to some embodiments, a training process of the first neural network may be: acquiring a sample user feature and an object feature of a sample object, and annotating a real recommendation result for the sample user feature and the object feature of the sample object, wherein the sample user feature comprises at least one sample user sub-feature, and the object feature of the sample object comprises at least one sample object sub-feature; outputting, by the first neural network, a first predicted recommendation result for the sample object in response to inputting the sample user feature and the object feature of the sample object to the first neural network; determining a loss value based on the real recommendation result and the first predicted recommendation result; and adjusting a parameter of the first neural network based on the loss value.

According to some embodiments, a sample user feature and an object feature of a sample object used in the training process of the first neural network may be the same as a sample user feature and an object feature of a sample object used in a training process of the second neural network. It may be understood that the sample user feature and the object feature of the sample object used in the training process of the first neural network may alternatively be different from the sample user feature and the object feature of the sample object used in the training process of the second neural network, which is not limited here.

For step S203, according to some embodiments, the object feature of the sample object may comprise a sample scenario identifier, and the sample feature that needs to be reinforced is determined based on the sample scenario identifier.

For step S206, according to some embodiments, the loss value may be determined based on only the real recommendation result and the second predicted recommendation result.

For step S206, according to some other embodiments, the loss value may be determined based on the real recommendation result, the first predicted recommendation result, and the second predicted recommendation result. In this way, the neural network may be trained by combining the predicted recommendation results output by the first neural network and the second neural network, and a training effect of the neural network can be improved.

In some embodiments, the loss value may be determined based on a weighted sum of the real recommendation result, the first predicted recommendation result, and the second predicted recommendation result. Particularly, the loss value may be determined based on an average value of the real recommendation result, the first predicted recommendation result, and the second predicted recommendation result.

Figure 3:
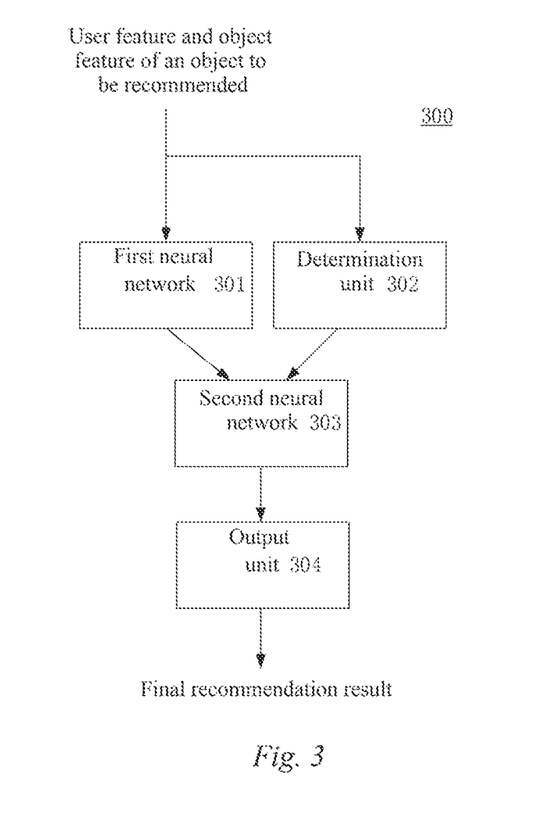
FIG. 3 is a schematic diagram showing a computer-implemented neural network according to some embodiments.

According to another aspect of the present disclosure, as shown in FIG. 3, a computer-implemented neural network 300 is further provided, wherein the neural network 300 is configured to receive a user feature and an object feature of an object to be recommended, so as to predict a final recommendation result for the object to be recommended, and the neural network 300 comprises: a first neural network 301 configured to output, in response to inputting the user feature and the object feature of the object to be recommended, a first recommendation result for the object to be recommended, wherein the user feature comprises at least one user sub-feature, and the object feature of the object to be recommended comprises at least one object sub-feature; a determination unit 302 configured to determine a feature that needs to be reinforced, wherein the feature that needs to be reinforced comprises one or more of the at least one user sub-feature and the at least one object sub-feature; a second neural network 303 configured to output, in response to inputting the first recommendation result and the feature that needs to be reinforced, a second recommendation result for the object to be recommended; and an output unit 304 configured to determine the final recommendation result based on at least the second recommendation result.

According to some embodiments, the object feature of the object to be recommended may comprise a recommendation scenario identifier, and the determination unit may be configured to determine, based on the recommendation scenario identifier, the feature that needs to be reinforced.

According to some embodiments, the output unit may be configured to determine, based on the first recommendation result and the second recommendation result, the final recommendation result for the object to be recommended.

According to some embodiments, the output unit may be further configured to determine a weighted sum of the first recommendation result and the second recommendation result as the final recommendation result.

According to some embodiments, one or both of the first neural network and the second neural network are a fully-connected neural network.

According to some embodiments, the object to be recommended may comprise one or more of the following types of data: text, audio, and video.

According to another aspect of the present disclosure, a computing device is further provided, comprising: a processor; and a memory that stores a program, the program comprising instructions that, when executed by the processor, cause the processor to perform one or more of the method for recommending an object and the training method described above.

According to another aspect of the present disclosure, a non-transitory computer-readable storage medium that stores a program is further provided, the program comprising instructions that, when executed by a processor of a computing device, cause the computing device to perform one or more of the method for recommending an object and the training method described above.

Figure 4:
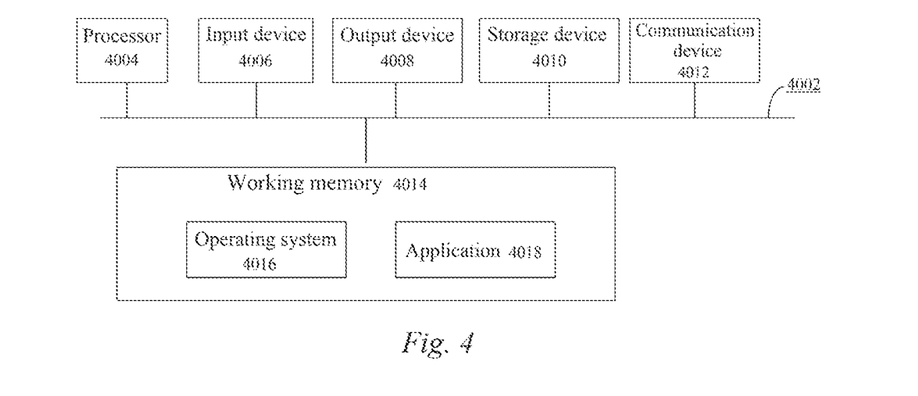
FIG. 4 is a structural block diagram showing a computing device that can be applied to some embodiments.

Referring to FIG. 4, a computing device 4000 is now described, which is an example of a hardware device that can be applied to various aspects of the present disclosure. The computing device 4000 may be any machine configured to perform processing and/or computation, which may be, but is not limited to, a workstation, a server, a desktop computer, a laptop computer, a tablet computer, a personal digital assistant, a robot, a smartphone, an onboard computer, or any combination thereof. The above methods may be implemented, in whole or at least in part, by the computing device 4000 or a similar device or system.

Software elements (programs) may be located in a working memory 4014, and may include, but is not limited to, an operating system 4016, one or more application programs 4018, drivers, and/or other data and code. The instructions for performing the foregoing methods and steps may be comprised in the one or more application programs 4018, and one or more of the method for recommending an object and the training method described above can be implemented by a processor 4004 by reading and executing the instructions of the one or more application programs 4018. More specifically, in the method for recommending an object described above, step S101 to step S104 may be implemented, for example, by the processor 4004 by executing the application program 4018 having instructions of step S101 to step S104. In the training method described above, step S201 to step S207 may be implemented, for example, by the processor 4004 by executing the application program 4018 having instructions of step S201 to step S207. Moreover, other steps of one or more of the method for recommending an object and the training method described above may be implemented, for example, by the processor 4004 by executing the application program 4018 having instructions for performing corresponding steps. Executable code or source code of the instructions of the software elements (programs) may be stored in a non-transitory computer-readable storage medium (e.g., a storage device 4010), and may be stored in the working memory 4014 when executed (may be compiled and/or installed). The executable code or source code of the instructions of the software elements (programs) may also be downloaded from a remote location.

It should further be appreciated that various variations may be made according to specific requirements. For example, tailored hardware may also be used, and/or specific components may be implemented in hardware, software, firmware, middleware, microcode, hardware description languages, or any combination thereof. For example, some or all of the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in accordance with the present disclosure.

It should further be understood that the foregoing methods may be implemented in a server-client mode. For example, the client may receive data input by a user and send the data to the server. Alternatively, the client may receive data input by the user, perform a part of processing in the foregoing method, and send data obtained after the processing to the server. The server may receive the data from the client, perform the foregoing method or another part of the foregoing method, and return an execution result to the client. The client may receive the execution result of the method from the server, and may present same to the user, for example, through an output device. The server may be a server in a distributed system, or a server combined with a blockchain. The server may alternatively be a cloud server, or an intelligent cloud computing server or intelligent cloud host with artificial intelligence technologies.

It should further be understood that the components of the computing device 4000 can be distributed over a network. For example, some processing may be performed by one processor while other processing may be performed by another processor away from the one processor. Other components of the computing system 4000 may also be similarly distributed. As such, the computing device 4000 can be interpreted as a distributed computing system that performs processing at a plurality of locations.

Although the embodiments or examples of the present disclosure have been described with reference to the drawings, it should be appreciated that the methods, systems and devices described above are merely some embodiments or examples, and the scope of the present invention is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

The invention claimed is:

1. A computer-implemented method, comprising:
inputting, to a first neural network, a user feature and an object feature of an object to be recommended, and acquiring a first recommendation result output by the first neural network for the object to be recommended, wherein the user feature comprises at least one user sub-feature, the object feature of the object to be recommended comprises at least one object sub-feature, and the object feature of the object to be recommended comprises a recommendation scenario identifier;
determining a feature that needs to be reinforced, wherein the feature that needs to be reinforced comprises one or more of the at least one user sub-feature and the at least one object sub-feature, and the feature that needs to be reinforced is determined based on the recommendation scenario identifier;
determining a one-hot code of the first recommendation result and a one-hot code of each sub-feature comprised in the feature that needs to be reinforced;
performing dimensionality reduction on the one-hot code of the first recommendation result by using a second embedded layer, to obtain an embedded word vector of the first recommendation result;

performing dimensionality reduction on the one-hot code of each sub-feature comprised in the feature that needs to be reinforced by using a first embedded layer, to obtain an embedded word vector of each sub-feature comprised in the feature that needs to be reinforced, wherein the first embedded layer is different from the second embedded layer;

splicing embedded word vectors corresponding to the first recommendation result and the feature that needs to be reinforced to obtain a spliced result;

inputting, to a second neural network, the spliced result, and acquiring a second recommendation result output by the second neural network for the object to be recommended; and determining, based on at least the second recommendation result, a final recommendation result for the object to be recommended.

2. The method of claim 1, wherein the final recommendation result is determined based on the first recommendation result and the second recommendation result.

3. The method of claim 2, wherein the final recommendation result is a weighted sum of the first recommendation result and the second recommendation result.

4. The method of claim 1, wherein one or both of the first neural network and the second neural network are a fully-connected neural network.

5. The method of claim 1, wherein the object to be recommended comprises one or more of the following types of data: text, audio, and video.

6. The method of claim 1, wherein the second neural network is trained after training of the first neural network and the second neural network is trained according to steps comprising:

acquiring a sample user feature and an object feature of a sample object, and annotating a real recommendation result for the sample object, wherein the sample user feature comprises at least one sample user sub-feature, and the object feature of the sample object comprises at least one sample object sub-feature;

determining a sample feature that needs to be reinforced, wherein the sample feature that needs to be reinforced comprises one or more of the at least one sample user sub-feature and the at least one sample object sub-feature;

outputting, by the first neural network, a first predicted recommendation result for the sample object in response to inputting the sample user feature and the object feature of the sample object to the first neural network;

outputting, by the second neural network, a second predicted recommendation result for the sample object in response to inputting, to the second neural network, the first predicted recommendation result and the sample feature that needs to be reinforced;

determining a loss value based on at least the real recommendation result and the second predicted recommendation result; and adjusting a parameter of the second neural network based on the loss value.

7. The method of claim 6, wherein the object feature of the sample object comprises a sample scenario identifier, and the sample feature that needs to be reinforced is determined based on the sample scenario identifier.

8. The method of claim 6, wherein the loss value is determined based on the real recommendation result, the first predicted recommendation result, and the second predicted recommendation result.

9. A computing device, comprising:
one or more processors; and
a memory storing one or more programs configured to be executed by the one or more processors, the one or more programs comprising instructions for:

inputting, to a first neural network, a user feature and an object feature of an object to be recommended, and acquiring a first recommendation result output by the first neural network for the object to be recommended, wherein the user feature comprises at least one user sub-feature, the object feature of the object to be recommended comprises at least one object sub-feature, and the object feature of the object to be recommended comprises a recommendation scenario identifier;

determining a feature that needs to be reinforced, wherein the feature that needs to be reinforced comprises one or more of the at least one user sub-feature and the at least one object sub-feature, and the feature that needs to be reinforced is determined based on the recommendation scenario identifier;

determining a one-hot code of the first recommendation result and a one-hot code of each sub-feature comprised in the feature that needs to be reinforced;

performing dimensionality reduction on the one-hot code of the first recommendation result by using a second embedded layer, to obtain an embedded word vector of the first recommendation result;

performing dimensionality reduction on the one-hot code of each sub-feature comprised in the feature that needs to be reinforced by using a first embedded layer, to obtain an embedded word vector of each sub-feature comprised in the feature that needs to be reinforced, wherein the first embedded layer is different from the second embedded layer;

splicing embedded word vectors corresponding to the first recommendation result and the feature that needs to be reinforced to obtain a spliced result;

inputting, to a second neural network, the spliced result, and acquiring a second recommendation result output by the second neural network for the object to be recommended; and determining, based on at least the second recommendation result, a final recommendation result for the object to be recommended.

10. The computing device of claim 9, wherein the final recommendation result is determined based on the first recommendation result and the second recommendation result.

11. The computing device of claim 10, wherein the final recommendation result is a weighted sum of the first recommendation result and the second recommendation result.

12. The computing device of claim 9, wherein one or both of the first neural network and the second neural network are a fully-connected neural network.

13. The computing device of claim 9, wherein the object to be recommended comprises one or more of the following types of data: text, audio, and video.

14. The computing device of claim 9, wherein the second neural network is trained after training of the first neural network and the second neural network is trained according to steps comprising:

acquiring a sample user feature and an object feature of a sample object, and annotating a real recommendation result for the sample object, wherein the sample user feature comprises at least one sample user sub-feature, and the object feature of the sample object comprises at least one sample object sub-feature;

determining a sample feature that needs to be reinforced, wherein the sample feature that needs to be reinforced comprises one or more of the at least one sample user sub-feature and the at least one sample object sub-feature;

outputting, by the first neural network, a first predicted recommendation result for the sample object in response to inputting the sample user feature and the object feature of the sample object to the first neural network;

outputting, by the second neural network, a second predicted recommendation result for the sample object in response to inputting, to the second neural network, the first predicted recommendation result and the sample feature that needs to be reinforced;

determining a loss value based on at least the real recommendation result and the second predicted recommendation result; and adjusting a parameter of the second neural network based on the loss value.

15. The computing device of claim 14, wherein the object feature of the sample object comprises a sample scenario identifier, and the sample feature that needs to be reinforced is determined based on the sample scenario identifier.

16. The computing device of claim 14, wherein the loss value is determined based on the real recommendation result, the first predicted recommendation result, and the second predicted recommendation result.

17. A non-transitory computer-readable storage medium, storing one or more programs comprising instructions that, when executed by one or more processors of a computing device, cause the computing device to perform operations comprising:

inputting, to a first neural network, a user feature and an object feature of an object to be recommended, and acquiring a first recommendation result output by the first neural network for the object to be recommended, wherein the user feature comprises at least one user sub-feature, the object feature of the object to be recommended comprises at least one object sub-feature, and the object feature of the object to be recommended comprises a recommendation scenario identifier;

determining a feature that needs to be reinforced, wherein the feature that needs to be reinforced comprises one or more of the at least one user sub-feature and the at least one object sub-feature, and the feature that needs to be reinforced is determined based on the recommendation scenario identifier;

determining a one-hot code of the first recommendation result and a one-hot code of each sub-feature comprised in the feature that needs to be reinforced;

performing dimensionality reduction on the one-hot code of the first recommendation result by using a second embedded layer, to obtain an embedded word vector of the first recommendation result;

performing dimensionality reduction on the one-hot code of each sub-feature comprised in the feature that needs to be reinforced by using a first embedded layer, to obtain an embedded word vector of each sub-feature comprised in the feature that needs to be reinforced, wherein the first embedded layer is different from the second embedded layer;

splicing embedded word vectors corresponding to the first recommendation result and the feature that needs to be reinforced to obtain a spliced result;

inputting, to a second neural network, the spliced result, and acquiring a second recommendation result output by the second neural network for the object to be recommended; and determining, based on at least the second recommendation result, a final recommendation result for the object to be recommended.

* * * * *